June 24, 1930.  C. C. FARMER  1,765,577
ANGLE COCK DEVICE
Filed Nov 24, 1928
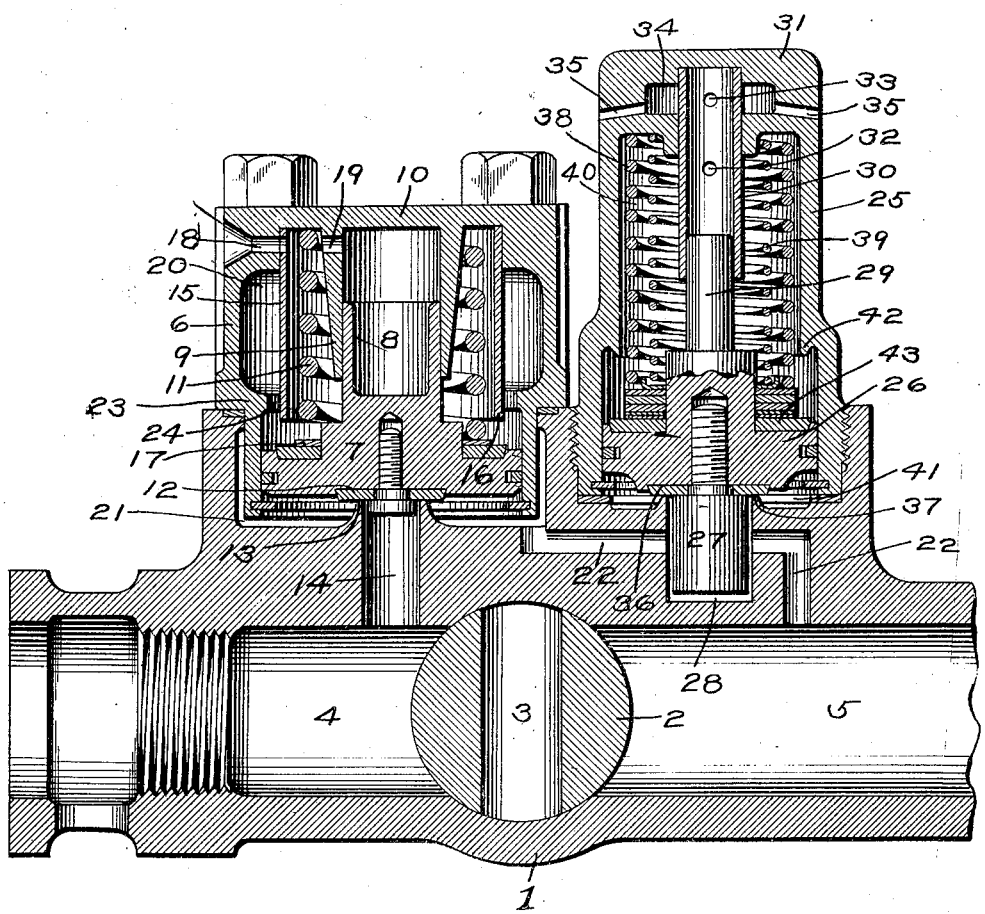
INVENTOR
CLYDE C. FARMER
BY *Wm. N. Cady*
ATTORNEY Patented June 24, 1930

1,765,577

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed November 24, 1928. Serial No. 321,542.

This invention relates to fluid pressure brakes and more particularly to an angle cock device for opening and closing communication through the brake pipe at the end of the car.

The principal object of my invention is to provide an angle cock device having a bypass for maintaining communication through the brake pipe in case the cock key should be accidentally or maliciously turned to its closed position and having means whereby an uncharged section of a train may be charged from a charged section without causing a sudden reduction in pressure in the charged section and a consequent emergency application of the brakes.

In the accompanying drawing, the single figure is a diagrammatic sectional view of an angle cock device embodying my invention.

As shown in the drawing, the angle cock device may comprise a casing 1 containing the usual plug valve or key 2 adapted to be operated by the usual handle (not shown). The valve 2 is provided with a passage 3 adapted in the open position of the valve to connect the conduit 4 at the brake pipe end of the angle cock with the conduit 5 at the flexible hose end.

Associated with the casing 1 is a cylinder 6 containing a valve piston 7. At one side, the valve piston 7 has a stem 8 mounted in a tubular boss 9 projecting inwardly from the head 10 of the cylinder 6, the boss 9 constituting means for guiding the valve piston 7, as will be readily understood.

At one side, the valve piston 7 is subject to the pressure of a coil spring 11 which encircles the boss 9, while at the other side the valve piston 7 is provided with a valve seat 12 adapted to engage a seat rib 13 formed in the casing 1 at the outer end of a passage 14 leading to the conduit 4.

Within the cylinder 6 is a sleeve 15 which projects from the head 10 towards the valve piston 7, the inner edge of the sleeve providing a seat 16 for limiting the outward movement of the valve piston.

The diameter of the sleeve 15 is greater than the diameter of the boss 9, and the spring 11 is disposed in the space therebetween, one end of the spring bearing against a follower 17 on the head of the valve piston 7, while the opposite end of the spring bears against the head 10.

The interior of the sleeve is open to the atmosphere through a passage 18 disposed adjacent to the head 10, and for the purpose of venting the interior of the boss, an opening 19 is formed in the wall of the boss in alinement with the passage 18.

As shown, the sleeve 15 bisects the chamber 20 of the cylinder 6 on the spring side of the valve piston 7, while the chamber 21 on the opposite side of the valve piston is connected to the conduit 5 by a by-pass or conduit 22. An annular rib 23 formed on the interior of the cylinder adjacent to the seat 16 provides a restricted passage 24 near the bottom of the chamber 20.

A second cylinder 25 is carried by the casing 1 and mounted therein is a valve piston 26 having at one side a plug 27 mounted in a chamber 28 in communication with the conduit 22, and having at the opposite side a stem 29 slidably mounted in a tube 30 projecting inwardly from the outer end wall or head 31 of the cylinder 25.

The tube 30 is provided with openings 32 and 33, the latter being juxtaposed with respect to a chamber 34 in the head 31, which chamber 34 is connected by passages 35 to the atmosphere.

The valve piston 26 has a valve seat 36 for engaging a seat rib 37 formed in the casing 1 at the outer end of the chamber 28 in order to control communication from the cylinder 25 to conduit 22.

At the opposite side, the valve piston 26 is subject to the pressure of two coil springs 38 and 39 arranged one within the other.

The chamber 40 of the cylinder 25 on the spring side of the valve piston 26 is connected to the atmosphere through the openings 32 and 33, chamber 34 and passage 35, while the chamber 41 on the opposite side of the valve piston 26 is closed when the valve seat 36 thereof is seated on the seat rib 37.

The cylinder 25 is provided with a seat rib 42 arranged on the wall of the chamber 40 to limit the outward movement of the valve piston 26, the joint between the valve piston and the seat rib 42 being sealed by a gasket 43 carried by the head of the valve piston.

The plug 27 preferably has a diameter less than the size of the chamber 28 to permit the flow of fluid through the conduit 22, the purpose of the plug being to restrict the flow through the conduit when the valve piston 26 is seated on the seat rib 37.

In operation, when a charged train section is to be connected to an uncharged train section, after the usual hose couplings are coupled together, the plug valve 2 of the angle cock on the uncharged section is turned to its open position and then the adjacent plug valve 2 of the angle cock on the charged section is turned to slightly opened position, such that the rate of flow from conduit 4 through passage 3 to conduit 5 will be slow enough to prevent a reduction in fluid pressure in the charged section of the brake pipe at an emergency rate.

In the angle cock device on the charged section of the train, the valve piston 7 will be initially held with the valve seat 12 engaging the seat rib 13 by the action of spring 11.

When the pressure of fluid flowing through conduit 22 into chamber 21 has been increased to a degree such that this pressure plus the pressure of fluid in passage 14 acting on the inner seated area of the valve piston 7 slightly exceeds the pressure of spring 11, for example five or six pounds, the valve piston 7 will be lifted from its seat, thereby permitting the fluid under full pressure in the train line to flow through passage 14 and enter chamber 21. The valve piston 7 is then quickly shifted to its upper seat 16, which action closes the chamber 20.

Due to leakage of the fluid past the piston, pressure of the fluid in chamber 20 will be built up when the valve piston 7 remains seated against the edge of the sleeve 15.

Fluid under pressure can now flow from conduit 4 through passage 14, chamber 21, and thence through conduit 22 to conduit 5.

The flow area of conduit 22 is restricted sufficiently by the plug 27 to prevent an emergency rate of reduction in the conduit 4 by flow to conduit 5.

When the pressure of the fluid in conduit 5 has been increased to a predetermined high degree, for example fifty pounds, the pressure of fluid within chamber 28 will be sufficient to overcome the opposing pressure of springs 38 and 39, so that the valve piston 26 will be lifted from its seat 37.

The full area of the valve piston 26 is then exposed to the pressure of fluid in chamber 41 and consequently the valve piston is quickly shifted to its upper seat provided by the seat rib 42. This movement of the valve piston 26 withdraws the plug 27 to a position above the conduit 22, thereby removing the restriction in the by-pass.

The flow area of the conduit 22 is sufficient to permit an emergency rate of flow so that an emergency rate of reduction in brake pipe pressure, as well as a service rate of reduction, may be effected around the plug valve 2 when the plug valve is in its closed position.

After the valve piston 26 has been moved from the seat rib 37, the pressure of fluid in the conduit 5 equals the pressure of fluid in the conduit 4, and therefore the plug valve 2 may then be moved to its full open position.

Assuming that the plug valve 2 is in full open position and the valve pistons 7 and 26 are raised and the pressure of fluid in the by-pass 22 equals the fluid pressure in the train line, when it is desired to disconnect a train section. the plug valve 2 on the adjacent car is turned to closed position, as shown in the drawing. When the adjoining hose couplings are uncoupled, the conduit 5 will be opened to the atmosphere.

As soon as the pressure of the fluid in the conduit 5 decreases, the pressure of the fluid in conduit 22 will also be reduced until the force of the spring 11 counteracts the pressure of the fluid in chamber 21 and the valve piston 7 is urged towards its seat 13.

The fluid pressure within chamber 20 will be equal substantially to the pressure of the fluid in the conduit 4 due to leakage around the piston rings when the valve piston is seated against the seat 16 when in its upper position. Thus the force exerted by the spring 11 in returning the valve piston 7 to its seat rib 13 will be assisted by the pressure of fluid in chamber 20, and therefore the inward movement of the valve piston is accelerated.

The fluid in chamber 20 flows through the passage 24 and enters the sleeve 15, from which it flows to the atmosphere by way of the vent 18.

When the valve 12 of the valve piston 7 seats against the seat rib 13, the further flow of fluid through the cock is prevented, and as the conduit 5 will be open to the atmosphere when the hose connections are uncoupled, the fluid in the conduit 22 will pass through the open end of conduit 5, thereby reducing the pressure of fluid in chamber 41 and permitting the springs 38 and 39 to expand, thereby returning the valve piston 26 to its seat rib 37.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a cock, and having a passage for establishing communication from one side of the cock to the other, valve means operated upon a predetermined increase in pressure of fluid at one side of the cock for opening the passage, and separate valve means for restricting the flow of fluid through the passage, said second valve means being operated by further increase in pressure of fluid in the passage whereby the restriction therein is removed.

2. An angle cock device comprising a cock, and having a passage for establishing communication from one side of the cock to the other, a valve piston operated upon a predetermined increase in pressure of fluid in the passage for controlling communication through the passage, and a valve piston adapted when seated to restrict the flow of fluid through the passage, said second valve piston being operable to remove the restriction from the passage when the pressure of fluid in the passage increases an amount greater than the amount of pressure required to operate the first-named valve piston.

3. An angle cock device comprising a cock, and having a passage from one side of the cock to the other, a valve piston for controlling communication through the passage, another valve piston operable independently of the first named valve piston, and means actuated by the second valve piston for restricting the flow of fluid through the passage.

4. An angle cock device comprising a cock, and having a passage permitting the flow of fluid under pressure from one side of the cock to the other at an emergency rate, means for restricting the flow of fluid through the passage at a rate less than the emergency rate, valve means for controlling communication through the passage, and valve means for actuating the said restricting means.

In testimony whereof I have hereunto set my hand, this 22nd day of November, 1928.

CLYDE C. FARMER.